P. OVERMAN.
FLEXIBLE CLOSURE FOR TIRE CASINGS.
APPLICATION FILED JAN. 29, 1917.

1,239,813. Patented Sept. 11, 1917.

INVENTOR
PHILIP OVERMAN
By F. M. Wright
Attorney

UNITED STATES PATENT OFFICE.

PHILIP OVERMAN, OF SANTA BARBARA, CALIFORNIA.

FLEXIBLE CLOSURE FOR TIRE-CASINGS.

1,239,813.  Specification of Letters Patent.  Patented Sept. 11, 1917.

Application filed January 29, 1917. Serial No. 145,089.

*To all whom it may concern:*

Be it known that I, PHILIP OVERMAN, a citizen of the United States, residing at Santa Barbara, in the county of Santa Barbara and State of California, have invented new and useful Improvements in Flexible Closures for Tire-Casings, of which the following is a specification.

The object of the present invention is to provide a device which will permit of the carrying of inflated spare tires to be mounted on quick detachable rims so as to eliminate the necessity of filling the tire on the road, and also to permit of easy replacement of a fresh inner tube.

Figure 1:
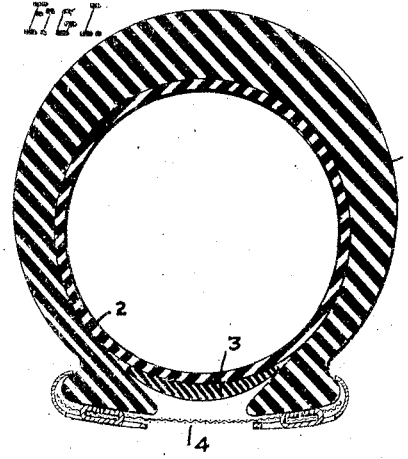
Figure 2:
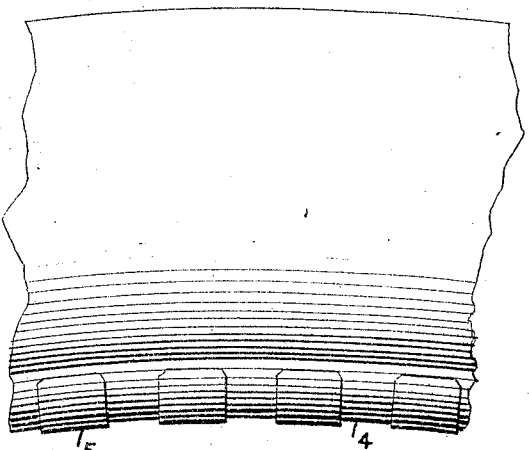
Figure 3:
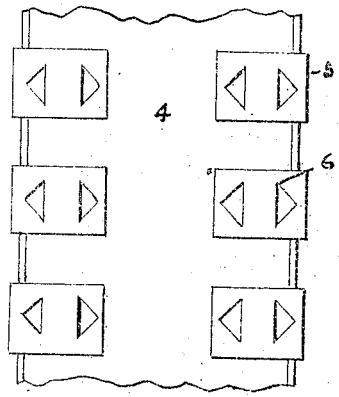
Figure 4:
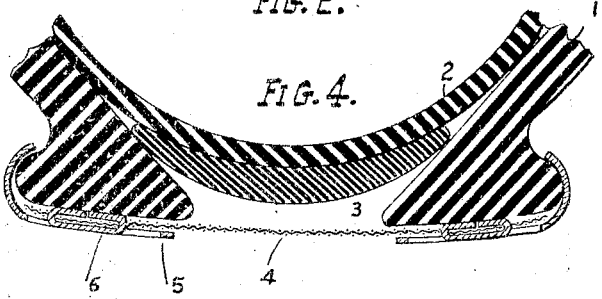
Figure 5:
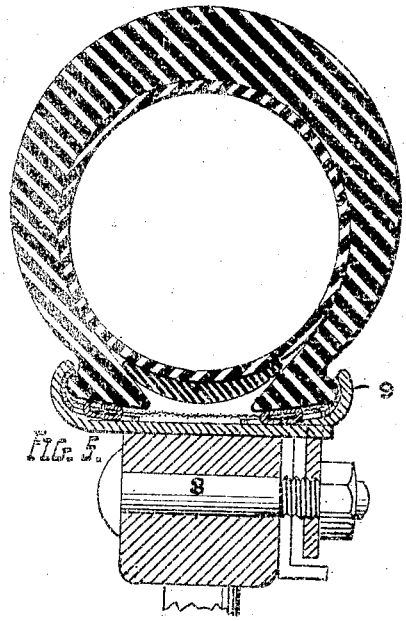
Figure 6:
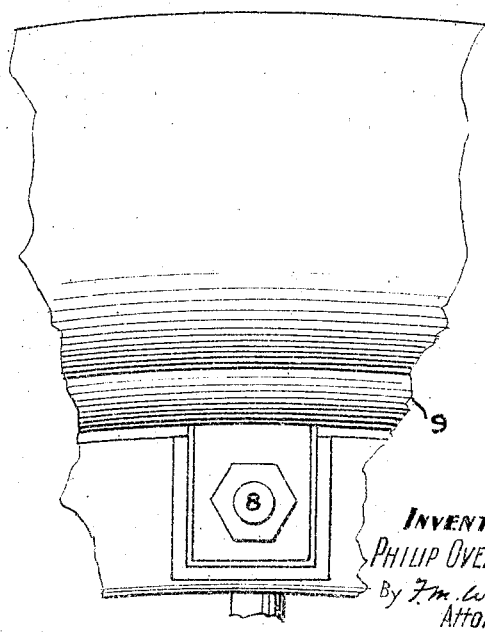

In the accompanying drawing Figure 1 is a cross section of a pneumatic tire equipped with my improved device and detached from the wheel, Fig. 2 is a broken side view of the same; Fig. 3 is a broken underside view of the same; Fig. 4 is an enlarged detail sectional view of a portion of the same; Fig. 5 is a cross-sectional view of a portion of a wheel showing the tire in position thereon; Fig. 6 is a broken side view of the same.

Referring to the drawings, 1 indicates an ordinary casing of a pneumatic tire, 2 an inner tube and 3 an annular flap for closing the opening between the edges of the casing. My improvement consists in providing an annular sheet 4, of flexible material, as cotton fabric, and which may be either continuous or not, as desired. To the inner side of this sheet, at suitable intervals of its length, metal clips or hooks 5 are secured by punching out and bending inward portions 6 thereof, which are passed through the flexible sheet to the side next the casing and then bent back on themselves so as to lie close against said sheet. Said metal clips are formed at their outer sides with hook-shaped portions 7 to engage the side flanges of the tire, and hold the edges of the tire in place. The flexible sheet is sufficiently strong to resist the pressure of the inner tube when inflated to its full extent.

A pneumatic tire equipped with my improved device can be carried on the machines already inflated and substituted for a punctured or ruptured tire, immediately.

The improved tire can be secured in place by the use of bolts 8 and rings 9 in the same manner as demountable rims.

I claim:—

In means for securing together the edges of a flanged casing of a pneumatic tire against the pressure due to the inflation of the inner tube, an annular sheet of flexible material, and hooks secured to each side of the sheet and adapted to engage the respective flanges of the tire casing.

PHILIP OVERMAN.